(12) United States Patent
Swyers et al.

(10) Patent No.: US 8,560,106 B2
(45) Date of Patent: Oct. 15, 2013

(54) PREDICTIVE MAINTENANCE FOR THIRD PARTY SUPPORT EQUIPMENT

(75) Inventors: John R. Swyers, Austin, TX (US); Manjunath Yedatore, Austin, TX (US); Tony L. Davis, Austin, TX (US); Donn Turner, Malta, NY (US); Michael W. Johnson, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 13/306,646

(22) Filed: Nov. 29, 2011

(65) Prior Publication Data

US 2012/0191225 A1 Jul. 26, 2012

Related U.S. Application Data

(60) Provisional application No. 61/418,359, filed on Nov. 30, 2010.

(51) Int. Cl.
*G05B 23/00* (2006.01)

(52) U.S. Cl.
USPC .............. 700/106; 700/49; 700/79; 700/108; 700/121; 700/96

(58) Field of Classification Search
None
See application file for complete search history.

(56) References Cited

U.S. PATENT DOCUMENTS

| | | | |
|---|---|---|---|
| 5,210,704 A * | 5/1993 | Husseiny | 702/34 |
| 5,710,723 A * | 1/1998 | Hoth et al. | 702/181 |
| 6,205,409 B1 * | 3/2001 | Zvonar | 702/183 |
| 6,735,549 B2 * | 5/2004 | Ridolfo | 702/181 |
| 6,853,951 B2 * | 2/2005 | Jarrell et al. | 702/181 |
| 7,016,825 B1 * | 3/2006 | Tryon, III | 703/6 |
| 7,133,727 B2 * | 11/2006 | Van Dyk et al. | 700/21 |
| 7,206,646 B2 * | 4/2007 | Nixon et al. | 700/83 |
| 7,337,032 B1 | 2/2008 | Nettles et al. | |
| 7,577,548 B1 * | 8/2009 | Przytula et al. | 702/182 |
| 7,590,896 B2 * | 9/2009 | Widmer et al. | 714/47.1 |
| 7,730,363 B2 * | 6/2010 | Takezawa et al. | 714/47.1 |
| 7,899,591 B2 * | 3/2011 | Shah et al. | 701/29.4 |
| 7,908,526 B2 * | 3/2011 | Guha | 714/54 |
| 7,987,108 B2 * | 7/2011 | Wetzer et al. | 705/7.12 |
| 8,065,112 B2 * | 11/2011 | Berwanger | 702/182 |
| 2002/0095269 A1 * | 7/2002 | Natalini et al. | 702/188 |
| 2002/0133254 A1 * | 9/2002 | Elwood et al. | 700/108 |
| 2002/0198627 A1 * | 12/2002 | Nasman et al. | 700/286 |
| 2003/0130755 A1 * | 7/2003 | Bazzocchi et al. | 700/100 |
| 2005/0010311 A1 | 1/2005 | Barbazette et al. | |
| 2005/0027379 A1 * | 2/2005 | Dyk et al. | 700/79 |

(Continued)

OTHER PUBLICATIONS

"International Search Report and Written Opinion", for PCT/US2011/062652, mailed Jul. 25, 2012, 9 pages.

*Primary Examiner* — Kavita Padmanabhan
*Assistant Examiner* — Christopher E Everett
(74) *Attorney, Agent, or Firm* — Blakely, Sokoloff, Taylor & Zafman, LLP (57) ABSTRACT

A server receives equipment data from third party support equipment during operation of the third party support equipment in a manufacturing environment. The server receives the equipment data via a first port on the third party support equipment. The third party support equipment communicates with a process tool via a second port on third party support equipment. The server determines a future state of the third party support equipment based on the equipment data and notifies a user of the future state of the third party support equipment.

20 Claims, 6 Drawing Sheets

(56) References Cited

U.S. PATENT DOCUMENTS

| | | |
|---|---|---|
| 2005/0096759 A1* | 5/2005 | Benjamin et al. ............... 700/62 |
| 2005/0179537 A1* | 8/2005 | Lewis ........................... 340/506 |
| 2005/0193270 A1* | 9/2005 | Fornasiero et al. ............. 714/39 |
| 2008/0086320 A1* | 4/2008 | Ballew et al. ..................... 705/1 |
| 2009/0195072 A1 | 8/2009 | Lee |
| 2010/0076729 A1 | 3/2010 | Davis et al. |
| 2010/0268579 A1* | 10/2010 | Momoh ...................... 705/14.1 |
| 2011/0137432 A1* | 6/2011 | Wang et al. ..................... 700/79 |
| 2011/0137697 A1* | 6/2011 | Yedatore et al. ............. 705/7.13 |
| 2011/0270482 A1* | 11/2011 | Holzer ........................... 701/29 |

\* cited by examiner

PREDICTIVE MAINTENANCE FOR THIRD PARTY SUPPORT EQUIPMENT

RELATED APPLICATION

This application is related to and claims the benefit of U.S. Provisional Patent application Ser. No. 61/418,359, filed Nov. 30, 2010, which is hereby incorporated by reference.

TECHNICAL FIELD

Embodiments of the present invention relate to predictive maintenance generally, and more particularly, to inline predictive maintenance for third party manufacturing support equipment.

BACKGROUND OF THE INVENTION

A manufacturing facility can include a number of manufacturing tools to perform processes to create a product (e.g., semiconductor). Generally, the operation of the manufacturing tools is monitored for predictive and preventive maintenance. Third party support equipment can be coupled to process tools to support the operation of the process tools. For example, a RF (radio frequency) matching unit maintains optimal delivery of power to a process chamber at radio frequency. Other examples of third party support equipment can include RF generators, vacuum systems, robot motors, ozone generators, etc. Currently, the real-time operation of third party support equipment is not being monitored for predictive maintenance. As a result, if support equipment fails, unexpectedly, a production line has to be halted to replace the failed support equipment. The shutdown of the production line results in unscheduled downtime and associated unplanned costs. After the support equipment has failed, the equipment is pulled off line and returned to the third party manufacturer for failure analysis. The manufacturer can manually extract data from the support equipment to determine the cause of the failure as part of a post-mortem process. However, post-mortem failure analysis occurs only after a production line has already incurred the unscheduled downtime and associated unplanned costs.

BRIEF DESCRIPTION OF THE DRAWINGS

The present invention is illustrated by way of example, and not by way of limitation, in the figures of the accompanying drawings and in which.

DETAILED DESCRIPTION

Embodiments of the invention are directed to a method and system for automatically performing predictive maintenance of third party support equipment. A server receives equipment data from third party support equipment during operation of the third party support equipment in a manufacturing environment. The server receives the equipment data via a first port on the third party support equipment. The third party support equipment communicates with a process tool via a second port on third party support equipment. The server determines a future state of the third party support equipment based on the equipment data and notifies a user of the future state of the third party support equipment.

Typically, the failure of third party support equipment is unexpected and results in unscheduled downtime of a production line. Embodiments of the invention provide automatic and real-time monitoring of third party support equipment for predictive maintenance. Embodiments of the invention allow users, such as factory administrators and process engineers, to anticipate when third party equipment will fail and to schedule an appropriate time to replace the equipment without interrupting the operation of a production line. Automatic and dynamic monitoring and predicting of the support equipment can avoid costs that are associated with unscheduled downs.

Figure 1:
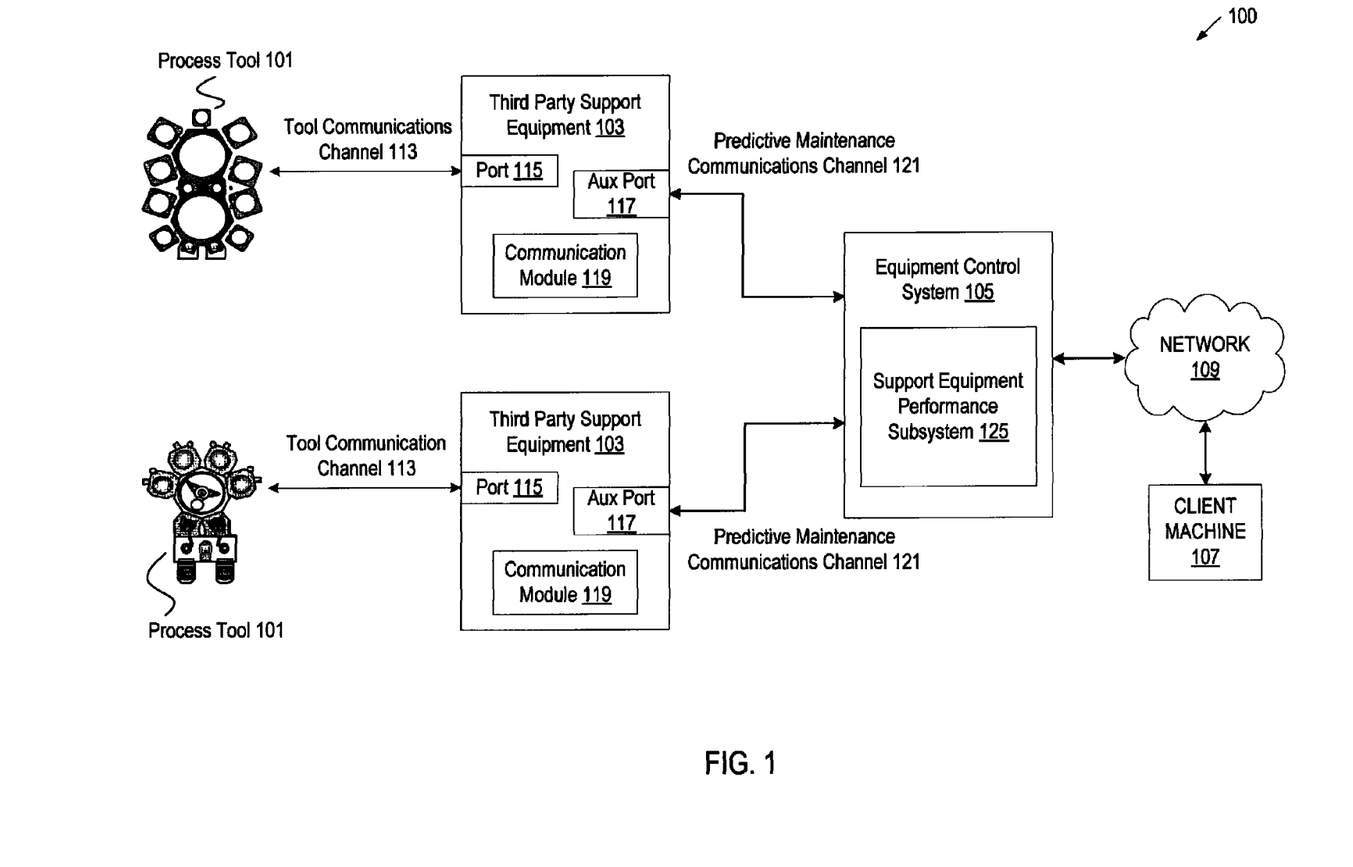
FIG. 1 illustrates an exemplary networking environment for determining a state of third party support equipment in-line to prevent unscheduled downtime, according to one embodiment of the invention.

FIG. 1 illustrates an exemplary network architecture 100 on which embodiments of the present invention can be implemented. The network architecture 100 can include process tools 101, third party support equipment 103, and an equipment control system 105. A factory can be a factory to manufacture products, such as semiconductors, or similar products which utilize a production line to create a final product. An equipment control system 105 can be coupled to the process tools 101 for gathering process tool data and for managing the production line. One example of an equipment control system 105 is an Applied E3™ server. The equipment control system 105 can be hosted by any type of computing device including server computers, desktop computers, laptop computers, handheld computers or similar computing device. The equipment control system 105, third party support equipment 103, and process tools 101 can be maintained by a factory administrator.

Examples of the process tools 101 include tools (e.g., etchers, chemical vapor deposition reactors, etc.) for the manufacture of electronic devices, such as semiconductors, or of a type for manufacturing of other products. A wafer manufacturing site (factory) may include process tools 101 that are clustered tools. For example, a process tool 101 may have tool components, such as one main transfer chamber and a few process chambers (e.g., plasma etching on multi-chamber cluster tools).

Third party support equipment 103 can be coupled to process tools 101 to support the operation of the process tools 101. Examples of third party support equipment 103 can include, and are not limited to, power generators (e.g., RF power generators, DC power generators), RF matching units, RPS (remote plasma system) units, vacuum components/systems, robot motors, flow controllers, gas generators, control valves, cooling systems, etc. An RF matching unit maintains optimal delivery of power to a process chamber at radio frequency. An RF generator is the power source for creating a wave, for example, for the RF matching unit. A vacuum system can be coupled to a process tool, such as a chamber, and control the chamber process.

The third party support equipment 103 can be coupled to process tools 101 via a hardware interface, such as a communications port 115 on the third party support equipment 103 to create a tool communications channel 113 between the third party support equipment 103 and a process tool 101. The third party support equipment 103 can also be coupled to the equipment control system 105 via a hardware interface, such as a communications port 117 on the third party support equipment 103 to create a predictive maintenance communications channel 121 between the third party support equipment 103 and the equipment control system 105. The communications port 117 can also be referred to as an auxiliary port. The predictive maintenance communications channel 121 is independent and separate from the tool communications channel 113. In one embodiment, the third party support equipment 103 can include a communication module 119 for providing support equipment data to the equipment control system 105. The communication module 119 can deliver a data signal to the auxiliary port 117 which is accessed by the equipment control system 105. One example of a communication module 119 is firmware for the third party support equipment 103.

In one embodiment, the equipment control system 105 (e.g., E3 server) can include a support equipment performance subsystem 125 to determine a state of the third party support equipment 103 inline to prevent unscheduled downtime. The support equipment performance subsystem 125 can determine a current state and/or a future state of the third party support equipment 103. Examples of different states for the third party support equipment 103 can include, and are not limited to, normal performance, part showing signs of wear, part near failure, part failure, etc. In another embodiment, the equipment control system 105 and the support equipment performance subsystem 125 can be individually hosted by one or more computing devices including server computers, desktop computers, laptop computers, handheld computers or similar computing devices. In such an embodiment, the third party support equipment 103 can be coupled to the support equipment performance subsystem 125 via a hardware interface, such as a communications port 117 on the third party support equipment 103 to create a predictive maintenance communications channel 121 between the third party support equipment 103 and the support equipment performance subsystem 125. In one embodiment, the third party support equipment 103 can include a communication module 119 for providing support equipment data to the support equipment performance subsystem 125. The communication module 119 can deliver a data signal to the auxiliary port 117 which is accessed by the support equipment performance subsystem 125.

The support equipment performance subsystem 125 can automatically collect data from third party support equipment 103 and analyze (e.g., model) the data to determine a state (e.g., current state, future state) of the third party support equipment 103 in real-time while the equipment 103 is operating during production. The third party support equipment 103 can be manufactured by a party (third party or third entity) that is different from the party (or entity) that provides and/or maintains the support equipment performance subsystem 125. The support equipment performance subsystem 125 can automatically collect data and determine a state of the support equipment manufactured by a number of different third parties. For example, a RF (radio frequency) unit is manufactured by Vendor A and a vacuum system is manufactured by Vendor B. The support equipment performance subsystem 125 can collect data from and determine the future state of the support equipment (RF unit) manufactured by Vendor A and the support equipment (vacuum system) manufactured by Vendor B. In addition, if existing support equipment made by Vendor A is replaced with support equipment made by Vendor C, the support equipment performance subsystem 125 can collect data from and determine the future state of the support equipment manufactured by Vendor C without disrupting the production line. The support equipment performance subsystem 125 is also modular in that it can also be removed from a production facility without affecting tool performance.

The support equipment performance subsystem 125 can notify a user, such as a factory administrator, process engineer, remote services engineer, support equipment owner, etc. of the state (e.g., current state, future state) of the third party support equipment 103 via a client machine 107. In turn, a user can plan for scheduled downtime to replace third party support equipment 103 before a failure occurs.

The support equipment performance subsystem 125 and client machine(s) 107 can be coupled via a network 109. The network 109 can be a local area network (LAN), such as an intranet within a company, a wireless network, a mobile communications network, a wide area network (WAN), such as the Internet or similar communication system. The network 109 can include any number of networking and computing devices such as wired and wireless devices. The client machine 107 can be hosted by any type of computing device including desktop computers, laptop computers, mobile communications devices, cell phones, smart phones, handheld computers, or similar computing device.

Figure 2:
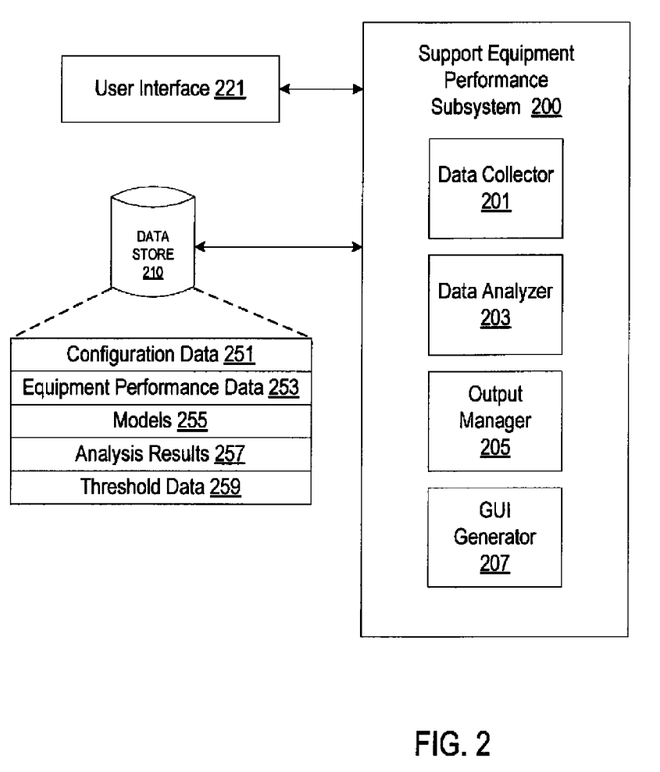
FIG. 2 is a block diagram illustrating a support equipment performance subsystem, according to one embodiment of the invention.

FIG. 2 is a block diagram illustrating a support equipment performance subsystem 200 for determining a state (e.g., current state, future state) of third party support equipment in-line to prevent unscheduled downtime. In one embodiment, the support equipment performance subsystem 200 is hosted by a computing device as described in conjunction with FIG. 1. The support equipment performance subsystem 200 can include a data collector 201, a data analyzer 203, an output manager 205, and a GUI generator 207.

The support equipment performance subsystem 200 can be coupled to third party support equipment (not shown) via a port (e.g., auxiliary port) on the support equipment which creates a communications channel that is independent and separate from a communications channel between the third party support equipment and a process tool. The data collector 201 can extract support equipment performance data 253 (equipment performance data) from the third party support equipment via the auxiliary port on the support equipment. The equipment performance data 253 can be accessed while the support equipment is operating in production. The equipment performance data 253 is indicative of the wear of the third party support equipment. Examples of equipment performance data 253 can include, and are not limited to, expended energy, mechanical movement count, etc. The equipment performance data 253 can be specific to the third party support equipment. For example, for an RF generator, equipment performance data 253 can include, and is not limited to, RF expended energy. In another example, for an RF matching unit, an example of equipment performance data 253 can include, and is not limited to, a count of a mechanical movement, such as the number of times a motor moves. The equipment performance data 253 can be stored in a data store 210 that is coupled to the support equipment performance subsystem 200.

The data store 210 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items The data collector 201 can be configured with the port number of the port (e.g., auxiliary port) to communicate with the third party support equipment and access the auxiliary port to extract the equipment performance data 253. The configuration data 251 can be stored in the data store 210. Examples of configuration data 251 can include, and are not limited to, port numbers of third party support equipment, format of the equipment performance data to be received from the third party support equipment, collection parameters specifying time periods for when to collect the equipment performance data, output parameters for generating reports and sending notifications, etc. The configuration data 251 can be user-defined. For example, a process engineer or a third party vendor can provide the configuration data 251 via a user interface 221. The configuration data 251 can be stored in a file in the data store 210 and is accessible by the data collector 201.

The data collector 201 can collect the equipment performance data 251 periodically. The configuration data 251 can include a collection parameter specifying time periods (e.g., weekly, every minute, every wafer, etc.) for when the data collector 201 is to obtain the equipment performance data 253 from the third party support equipment. The collection parameter can be user-defined. The collection parameter can be specific to the support equipment. For example, for an RF matching unit, the data collector 201 collects data pertaining to the number of times a component moves. A process engineer or a third party vendor can provide the collection parameter for an RF unit via a user interface 221 to specify that the data collector 201 collect the mechanical count once a week.

Equipment performance data 253 (e.g., expended energy, mechanical movement count, etc.) can also include, and is not limited to, a third party support equipment identifier (e.g., serial number), the manufacturer of the third party support equipment, the version of the communication module of the support equipment, the date and time the data is collected, etc.

Figure 3:
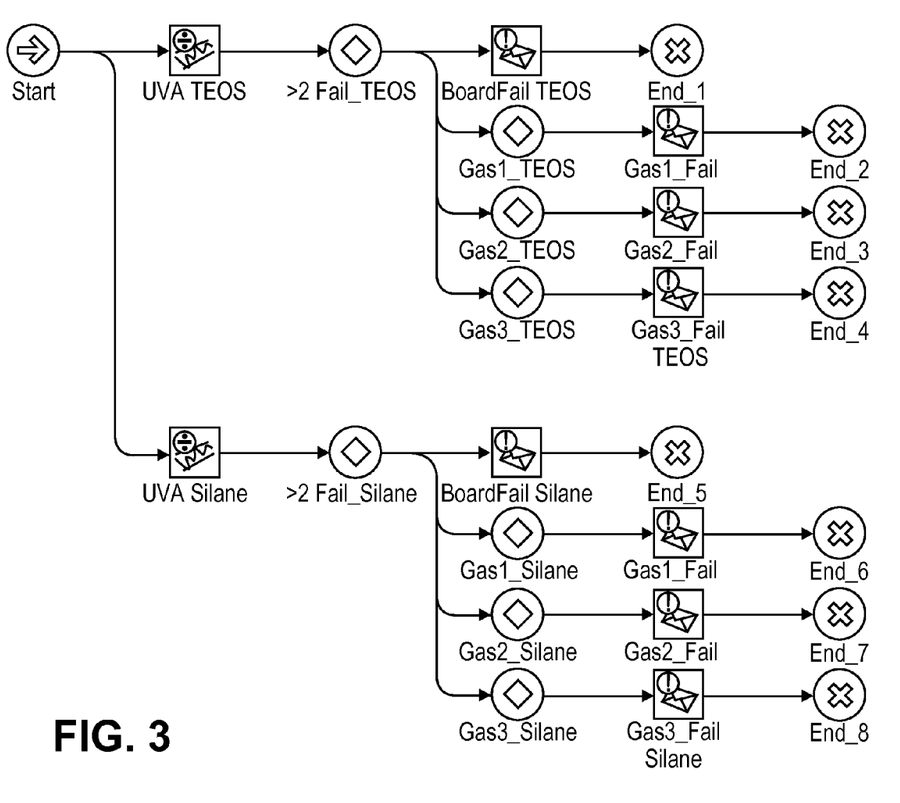
FIG. 3 illustrates an exemplary model for simulating the future state of third party support equipment, according to one embodiment of the invention.

The data analyzer 203 can determine a state (e.g., current state, future state) of the third party support equipment and monitor the state in real-time to identify potential future equipment failures and/or to notify users of a state. The data analyzer 203 can use the equipment performance data 253 to populate models 255 to simulate the performance (e.g., future state) of the third party support equipment. Examples of models 255 can include, and are not limited to, models to simulate third party support equipment performance, process performance, tool performance, etc. The models 255 can be user-defined. FIG. 3 illustrates an exemplary model for simulating the future state of third party support equipment, such as a mass flow controller. Returning to FIG. 2, the data analyzer 203 can generate modeling results and store the modeling results as part of analysis results 257 in the data store 210. The data analyzer 203 can predict the state of the third party support equipment and determine whether and when the third party support equipment is likely to fail based on the analysis results 257. One embodiment of a method for using models to determine a state (e.g., current state, future state) of third party support equipment is described in greater detail below in conjunction with FIG. 5.

The data analyzer 203 can also use threshold data 259 to determine a state of the third party support equipment (e.g., to predict whether and when the third party support equipment is likely to fail). Third party support equipment can have corresponding performance thresholds. Threshold data 259 can be a number value, a range, a percentage, etc. A performance threshold can be an indicator of when support equipment is likely to fail. For example, typically, a RF unit has a lifetime of two to three years, depending on what process it is running, how often the RF unit is run, and how much power is being supplied to it. An example performance threshold for a RF matching unit, can include, and is not limited to, a number of mechanical movements of 1 million. The data analyzer 203 is continually collected performance data 253 and can compare the current equipment performance data 253 to the threshold data 259 in real-time to determine whether a component is approaching the 1 million threshold. The data analyzer 203 can generate threshold results and store the threshold results as part of the analysis results 257 in the data store 210. When the equipment performance data 253 approaches a threshold, the data analyzer 203 determines that the support equipment is likely to fail soon. The threshold data 259 can be user-defined. For example, a process engineer or a third party vendor can provide the threshold data 259 via a user interface 221. The threshold data 259 can be stored in the data store 210. The threshold data 259 can be stored in a file in the data store 210 and is accessible by the data analyzer 203.

In one embodiment, a control system (e.g., an E3 server) collects tool data from process tools (e.g., process tools 101 in FIG. 1) and stores the tool data in a data store (e.g., data store 210). The data analyzer 203 can be coupled the data store to access the tool data. In some cases, the equipment performance data 253 can be received from the support equipment in a format to allow the data analyzer 203 to readily integrate the support equipment performance data with the tool data. In other cases, the data analyzer 203 can convert the format of the support equipment performance data 253 to a format that is compatible with the tool data. The data analyzer 203 can integrate the support equipment performance data 253 with the tool data and perform a comprehensive predictive maintenance analysis, for example, using the models 255 and/or threshold data 259.

The output manager 205 can generate notifications and send notifications to users, such as a factory administrator, spares team member, process engineer, remote services engineer, support equipment owner, etc. The output manager 205 can notify one or more users of a state (e.g., current state, future state) of the third party support equipment. For example, when the data analyzer 203 determines that a mechanical count for an RF unit is approaching a threshold, the output manager 205 can send a notification to a user that the RF unit is in a part near failure state. Examples of notifications can include, and are not limited to, messages communicated over a network (e.g., email messages, text messages, instant messages, social network messages, etc.), visual/sound alarm indicators on a client device (e.g., client machine 107 in FIG. 1), etc. In turn, a user can plan for scheduled downtime to prevent process failures by replacing the support equipment before an anticipated failure occurs.

The output manager 205 can also generate reports and output the reports to an output device (e.g., display on a client machine 107, printer, etc.) based on configuration data 251 that specifies output parameters for generating the reports and sending notifications. The output parameters can be user-defined, for example, by a process engineer, remote services engineer, factory administrator, third party vendor, etc. The output parameters can specify conditions for when to generate a report and the type of report to generate. The output parameters can specify conditions for notifying one or more users of the state of the third party support equipment. The output manager 205 can also cause actions to be performed, such as causing support equipment and/or process tool to be offline. One embodiment of a method for generating reports and/or notifications based on output parameters is described in greater detail below in conjunction with FIG. 4 and FIG. 5.

The GUI (graphical user interface) generator 207 can generate GUIs displaying the output (e.g., notifications, reports, etc.) generated by the output manager 205. The GUIs can include web pages accessible by a user via a client device (e.g., client machine 107). The GUI generator 207 can also generate a user interface 221 to receive user input. The user interface 221 can be a graphical user interface.

Figure 4:
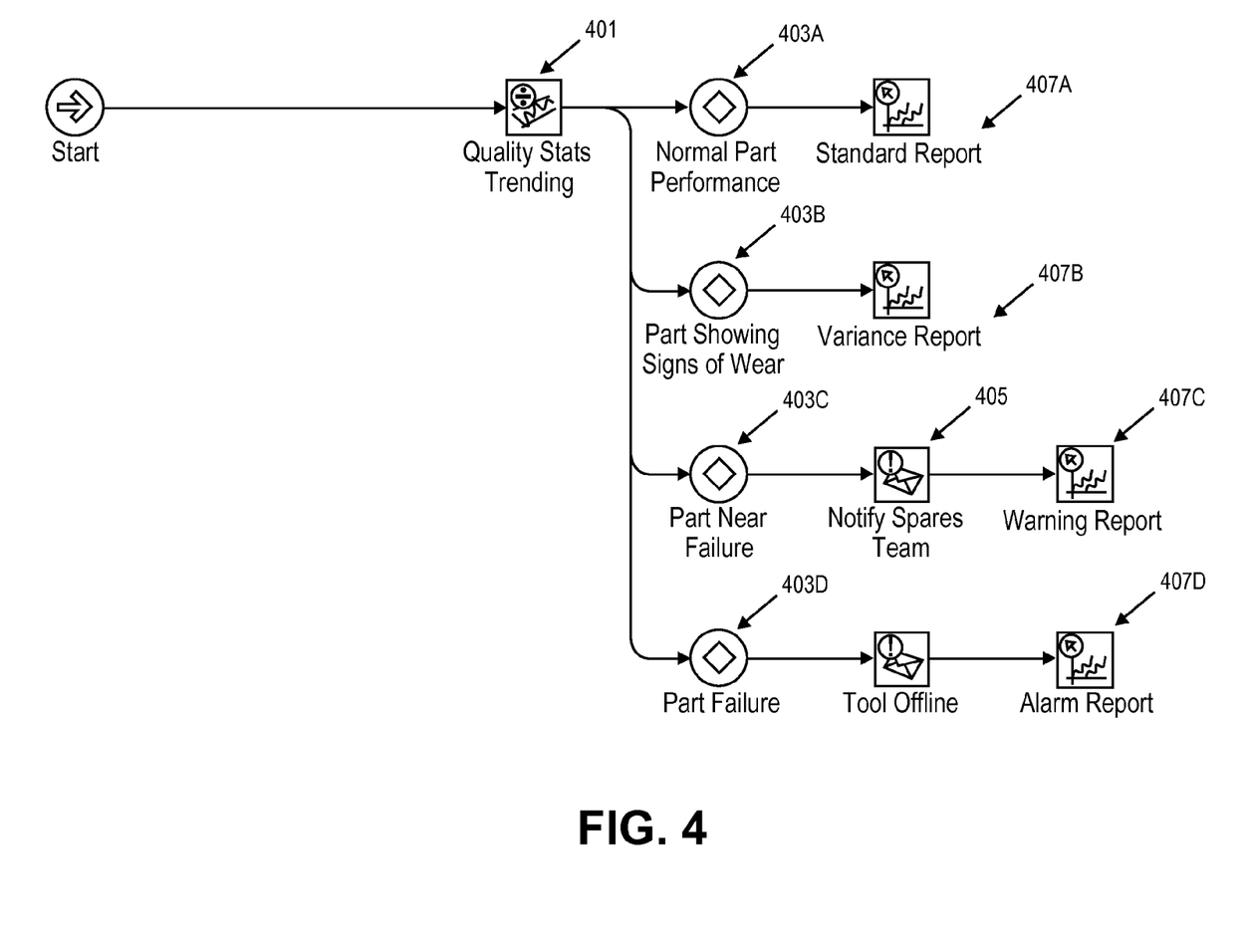
FIG. 4 illustrates an exemplary GUI for configuring a support equipment performance subsystem, according to one embodiment of the invention.

FIG. 4 illustrates an exemplary GUI for configuring a support equipment performance subsystem to use equipment performance data 253 (e.g., quality stats 401) to trigger actions to be performed, for example, by the output manager 205. The output parameters can specify the state conditions to be met before a report is generated and the type of report to generate, and when to notify one or more users of the state of the third party support equipment and the type of notification to deliver. For example, when an analysis of the equipment performance data 253 (e.g., quality stats 401) indicates that a third party support equipment is in a state of 'normal part performance' 403A, the output manager 205 can generate a standard report 407A. Other examples of output parameters can include, and are not limited to, generating a variance report 407B when an analysis of the quality stats 401 indicates that third party support equipment is in a state of 'part showing signs of wear' 403B, generating a warning report 407C and notifying the spares team 405 when an analysis of the quality stats 401 indicates that third party support equipment is in a state of 'part near failure' 403C, and generating an alarm report 407D when an analysis of the quality stats 401 indicates that third party support equipment is in a state of 'part failure' 403D.

Figure 5:
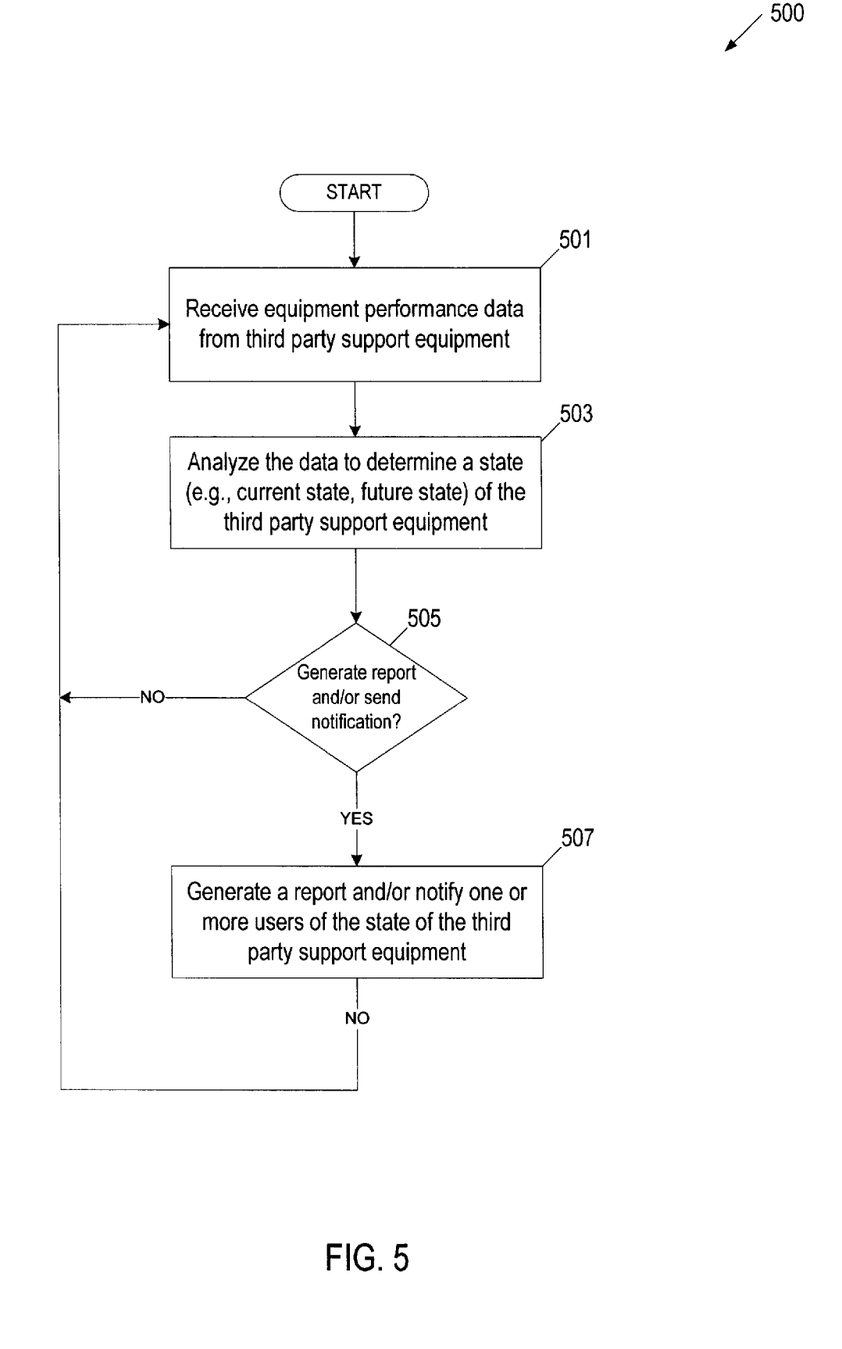
FIG. 5 is a flowchart which illustrates an embodiment of a method for determining a state of third party support equipment in-line to prevent unscheduled downtime.

FIG. 5 is a flowchart which illustrates an embodiment of a method 500 for determining the state (e.g., current state, future state) of third party support equipment in-line to prevent unscheduled downtime. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the support equipment performance subsystem 125 of FIG. 1.

At block 501, the support equipment performance subsystem receives equipment performance data from one or more third party support equipment. The support equipment performance subsystem can be coupled to third party support equipment via a communications channel that is independent and separate from a communications channel between the third party support equipment and a process tool. For example, a RF matching unit can be coupled to the support equipment performance subsystem via an auxiliary port on the RF matching unit, and the RF matching unit can be coupled to a process tool via a different port on the RF matching unit.

The support equipment performance subsystem can access the equipment performance data while the support equipment is operating in production. For example, the support equipment performance subsystem can extract data representing a mechanical movement from a RF matching unit while the RF matching unit is in operation and can store equipment performance data in a data store that is coupled to the support equipment performance subsystem.

The support equipment performance subsystem can obtain the equipment performance data from the support equipment periodically. The support equipment performance subsystem can determine when to collect the equipment performance data based on configuration data that specifies time periods (e.g., weekly, every minute, every wafer, etc.) which correspond to specific third party equipment. For example, the support equipment performance subsystem can extract the mechanical movement count from the RF matching unit once a week. In another example, the support equipment performance subsystem can extract equipment performance data from a robot motor whenever a wafer is processed.

At block 503, the support equipment performance subsystem analyzes the data to determine a state of the one or more third party support equipment using the equipment performance data. The state can be a current state and/or a future state of the third party support equipment. The support equipment performance subsystem can compare the collected equipment performance data to threshold data to determine the state of the third party support equipment and to predict whether and when the third party support equipment is likely to fail. The threshold data can be a number value, a range, a percentage, etc. and/or a combination of such. For example, the support equipment performance subsystem can determine whether the current number of mechanical movements for a RF matching unit is within a user-defined range of 1 million. If the mechanical movements approach the threshold, the support equipment performance subsystem determines that the RF matching unit is in a 'part near failure' state and predicts that the RF unit will fail soon. The support equipment performance subsystem can generate threshold results and store the threshold results as part of analysis results in a data store that is coupled to the support equipment performance subsystem.

The support equipment performance subsystem can use models to perform a more comprehensive analysis to determine a future state of the third party support equipment and to determine whether and when the third party equipment is likely to fail. For example, the support equipment performance subsystem can use the equipment performance data to populate models to simulate the future performance of the third party support equipment. Examples of models can include, and are not limited to, models to simulate third party support equipment performance, process performance, tool performance, etc. The models can be user-defined. The support equipment performance subsystem can generate modeling results and store the modeling results as part of the analysis results in the data store. The support equipment performance subsystem can predict whether and when the third party support equipment is likely to fail based on the predicted states from the analysis results (e.g., modeling results). In one embodiment, a control system (e.g., an E3 server) collects tool data from process tools and stores the tool data in a data store. The support equipment performance subsystem can be coupled to the data store to access the tool data and integrate the equipment performance data with the tool data and perform a comprehensive predictive maintenance analysis, for example, using the models and/or threshold data.

At block 505, the support equipment performance subsystem determines whether to generate a report and/or notify a user of the predicted performance based on the predictions at block 503. As described above in one embodiment in conjunction with FIG. 4, the support equipment performance subsystem can be configured to generate a report and/or notify one or more users of the state of the third party support equipment when pre-defined conditions are met. For example, when an analysis of the equipment performance data indicates that a third party support equipment is in a state of 'part near failure', the support equipment performance subsystem can generate a warning report and notify the spares team. For instance, when the support equipment performance subsystem determines that the current number of mechanical movements for a RF matching unit is within a user-defined range of 1 million, the support equipment performance subsystem determines that the RF matching unit is approaching failure (i.e., meets the condition to be in a 'part near failure' state). Other examples can include, and are not limited to, generating a standard report for users to review when an analysis of the equipment performance data indicates that a third party support equipment is in a state of 'normal part performance', generating a variance report when an analysis of the equipment performance data indicates that a third party support equipment is in a state of 'part showing signs of wear', and generating an alarm report when an analysis of the equipment performance data indicates that a third party support equipment is in a state of 'part failure.'

If support equipment performance subsystem determines to not generate a report and/or notify user(s) (block 505), the support equipment performance subsystem returns to block 501 to continue receiving equipment performance data. If support equipment performance subsystem determines to generate a report and/or notify user(s) (block 505), the support equipment performance subsystem generates an appropriate report and/or sends an appropriate notification to one or more users at block 507 and returns to block 501 to continue receiving equipment performance data. The support equipment performance subsystem can generate notifications and send notifications to users, such as a factory administrator, spares team member, process engineer, remote services engineer, support equipment owner, etc. Examples of notifications can include, and are not limited to messages communicated over a network (e.g., email messages, text messages, instant messages, social network messages, etc.), visual/sound alarm indicators on a client device (e.g., client machine 107 in FIG. 1), etc. In turn, a user can plan for scheduled downtime to prevent process failures by replacing the support equipment before an anticipated failure occurs. For example, a factory administrator may know of a preventive maintenance that is scheduled in the evening and can plan to replace the RF matching unit during this scheduled preventive maintenance.

Figure 6:
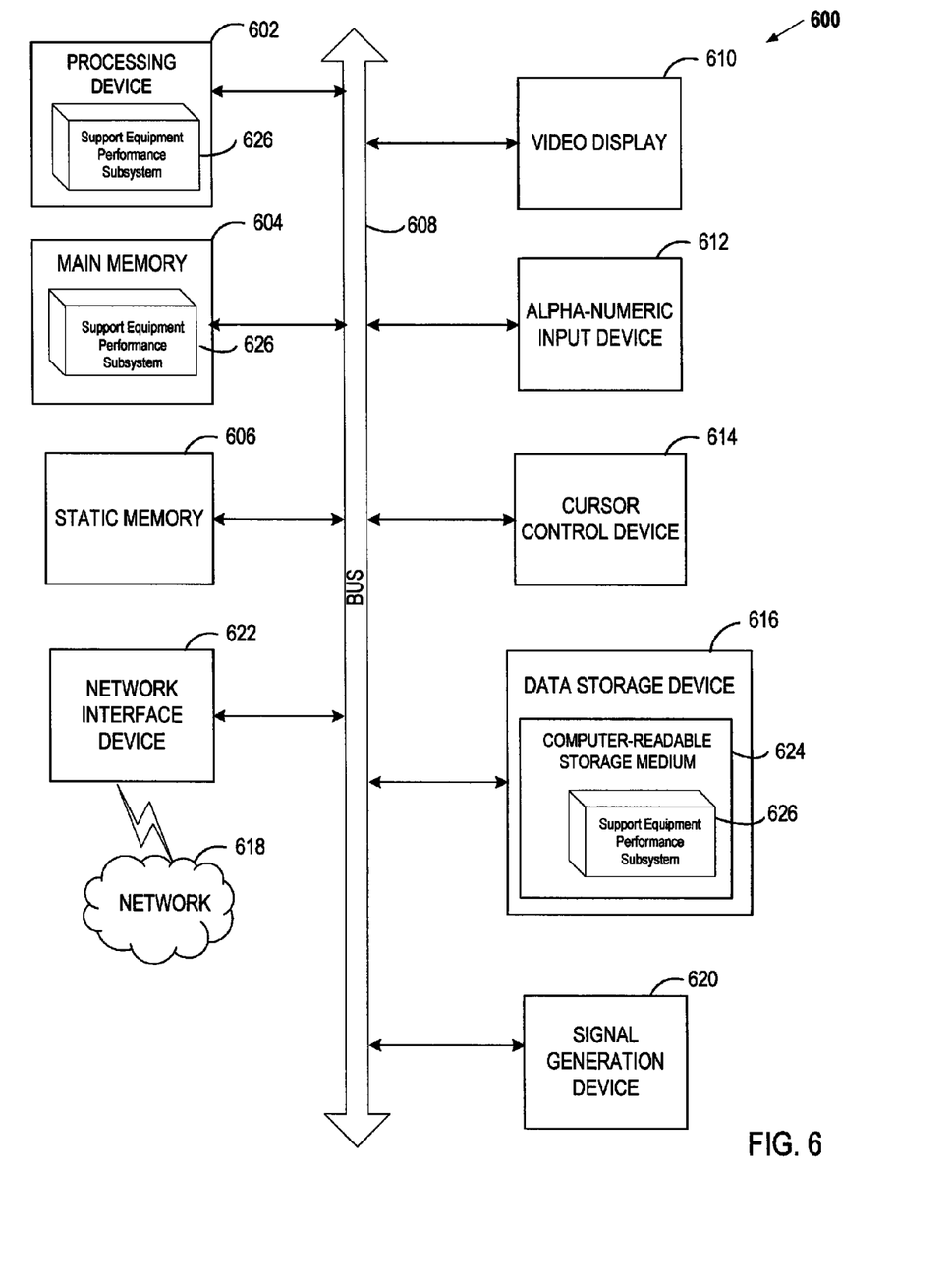
FIG. 6 illustrates an exemplary computer system.

FIG. 6 is a diagram of one embodiment of a computer system for determining a state (e.g., current state, future state) of third party support equipment in-line to prevent unscheduled downtime. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the support equipment performance subsystem 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the support equipment performance subsystem 626) embodying any one or more of the methodologies or functions described herein. The support equipment performance subsystem 626 may also reside, completely or at least partially, within the main memory 604 and/or within the processing device 602 during execution thereof by the computer system 600, the main memory 604 and the processing device 602 also constituting machine-readable storage media. The support equipment performance subsystem 626 may further be transmitted or received over a network 618 via the network interface device 622.

The computer-readable storage medium 624 may also be used to store the support equipment performance subsystem 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The support equipment performance subsystem 626, components and other features described herein (for example in relation to FIG. 1) can be implemented as discrete hardware components or integrated in the functionality of hardware components such as ASICS, FPGAs, DSPs or similar devices. In addition, the support equipment performance subsystem 626 can be implemented as firmware or functional circuitry within hardware devices. Further, the support equipment performance subsystem 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "determining," "notifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for determining a state (e.g., current state, future state) of third party support equipment in-line to prevent unscheduled downtime. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving, by a server comprising a support equipment performance subsystem and a processing device, equipment data from a plurality of different types of third party support equipment during operation of the plurality of different types of third party support equipment in a manufacturing environment,
   wherein the equipment data is received via a first port on the plurality of different types of third party support equipment and the plurality of different types of third party support equipment communicates with a respective process tool via a second port on the plurality of different types of third party support equipment;
   receiving, by the server, configuration data comprising a format for receiving the equipment data from the plurality of different types of third party support equipment with the format of each third party support equipment being associated with a respective third party manufacturer;
   determining, by the server, a future state of each of the plurality of different types of third party support equipment that are manufactured by different third parties based on the equipment data;
   wherein the server is removable from the manufacturing environment without affecting performance of the manufacturing environment and failure of a third party support equipment affects performance of the respective process tool in the manufacturing environment,
   wherein a process tool manufactures devices and a respective third party support equipment supports the process tool.

2. The computer-implemented method of claim 1, wherein one of the third party support equipment is manufactured by a first entity and the support equipment performance subsystem is maintained by a second entity, wherein the first entity and the second entity are different.

3. The computer-implemented method of claim 1, wherein the server of the support equipment performance subsystem automatically collects data.

4. The computer-implemented method of claim 1, further comprising:
   receiving, by the support equipment performance subsystem, configuration data comprising a time period for receiving the equipment data.

5. The computer-implemented method of claim 1, wherein the future state of at least one of the third party support equipment predicts a failure of the third party support equipment.

6. The computer-implemented method of claim 1, wherein the future state of at least one of the third party support equipment comprises at least one of normal performance, part showing signs of wear, part near failure, and part failure.

7. The computer-implemented method of claim 1, further comprising:
comparing, in real-time, the equipment data to threshold data to determine whether at least one of the third party support equipment is above a performance threshold, wherein the performance threshold indicates a failure of the respective third party support equipment.

8. The computer-implemented method of claim 1, wherein the first port is independent and separate from the second port.

9. A non-transitory computer-readable memory medium embodied with executable code that cause a processor to perform operations comprising:
receiving equipment data from a plurality of different types of third party support equipment during operation of the plurality of different types of third party support equipment in a manufacturing environment,
wherein the equipment data is received via a first port on the plurality of different types of third party support equipment and the plurality of different types of third party support equipment communicates with a respective process tool via a second port on the plurality of different types of third party support equipment;
receiving configuration data comprising a format for receiving the equipment data from the plurality of different types of third party support equipment with the format of each third party support equipment being associated with a respective third party manufacturer;
determining a future state of each of the plurality of different types of third party support equipment that are manufactured by different third parties based on the equipment data;
wherein the server is removable from the manufacturing environment without affecting performance of the manufacturing environment and failure of a third party support equipment affects performance of the respective process tool in the manufacturing environment,
wherein a process tool manufactures devices and a respective third party support equipment supports the process tool.

10. The non-transitory computer-readable memory medium of claim 9, wherein the support equipment performance subsystem is removable from the manufacturing environment without affecting performance of the manufacturing environment.

11. The non-transitory computer-readable memory medium of claim 9, further comprising:
receiving configuration data comprising a time period for receiving the equipment data.

12. The non-transitory computer-readable memory medium of claim 9, wherein the future state of at least one of the third party support equipment predicts a failure of the third party support equipment.

13. The non-transitory computer-readable memory medium of claim 9, wherein the future state of at least one of the third party support equipment comprises at least one of normal performance, part showing signs of wear, part near failure, and part failure.

14. The non-transitory computer-readable memory medium of claim 9, further comprising:
comparing, in real-time, the equipment data to threshold data to determine whether at least one of the third party support equipment is above a performance threshold, wherein the performance threshold indicates a failure of the third party support equipment.

15. The non-transitory computer-readable memory medium of claim 9, further comprising:
automatically collecting data and determining a state of a plurality of third party support equipment that are manufactured by different third parties, wherein the first port is independent and separate from the second port.

16. A computerized system comprising
a processor coupled to a memory through a bus; and
instructions executed from the memory by the processor to cause the processor
to receive equipment data from a plurality of different types of third party support equipment during operation of the plurality of different types of third party support equipment in a manufacturing environment,
wherein the equipment data is received via a first port on the plurality of different types of third party support equipment and the plurality of different types of third party support equipment communicates with a respective process tool via a second port on the plurality of different types of third party support equipment;
receive configuration data comprising a format for receiving the equipment data from the plurality of different types of third party support equipment with the format of each third party support equipment being associated with a respective third party manufacturer;
determine a future state of each of the plurality of different types of third party support equipment that are manufactured by different third parties based on the equipment data;
wherein the server is removable from the manufacturing environment without affecting performance of the manufacturing environment and failure of a third party support equipment affects performance of the respective process tool in the manufacturing environment,
wherein a process tool manufactures devices and a respective third party support equipment supports the process tool.

17. The computerized system of claim 16, wherein the instructions further cause the processor to:
receive configuration data comprising a time period for receiving the equipment data.

18. The computerized system of claim 16, wherein the future state of at least one of the third party support equipment predicts a failure of the third party support equipment.

19. The computerized system of claim 16, wherein the instructions further cause the processor to: compare, in real-time, the equipment data to threshold data to determine whether at least one of the third party support equipment is above a performance threshold, wherein the performance threshold indicates a failure of the third party support equipment.

20. The computerized system of claim 16, wherein the instructions further cause the processor to:
automatically collect data and to determine a state of a plurality of different types of third party support equipment, wherein the first port is independent and separate from the second port.

* * * * *